United States Patent [19]

Finkel

[11] 3,885,991

[45] May 27, 1975

[54] PRIMARY ELECTROCHEMICAL CELL
[75] Inventor: Joel Roberts Finkel, Wayland, Md.
[73] Assignee: GTE Laboratories Incorporated, Waltham, Mass.
[22] Filed: May 28, 1974
[21] Appl. No.: 473,460

[52] U.S. Cl. ................................. 136/107; 136/181
[51] Int. Cl. ............................................. H01m 1/02
[58] Field of Search ............ 136/182, 181, 173, 107

[56] References Cited
UNITED STATES PATENTS

| | | | |
|---|---|---|---|
| 2,672,498 | 3/1954 | Temple | 136/181 |
| 3,080,440 | 3/1963 | Ruetschi et al. | 136/181 |
| 3,506,902 | 4/1970 | Sullivan | 136/173 |
| 3,622,397 | 11/1971 | Belove | 136/181 |

Primary Examiner—Donald L. Walton
Attorney, Agent, or Firm—Irving M. Kriegsman; Bernard L. Sweeney

[57] ABSTRACT

A primary electrochemical cell includes a device having essentially unidirectional current flow and low voltage drop in the current flow direction characteristics. Electrically, the device is internally connected between one of the poles of the cell and the associated electrode in such a manner that current flow in a recharging direction within the primary cell is prevented so that both recharging and reverse polarity operation of the primary cell are precluded.

12 Claims, 4 Drawing Figures

PATENTED MAY 27 1975  3,885,991
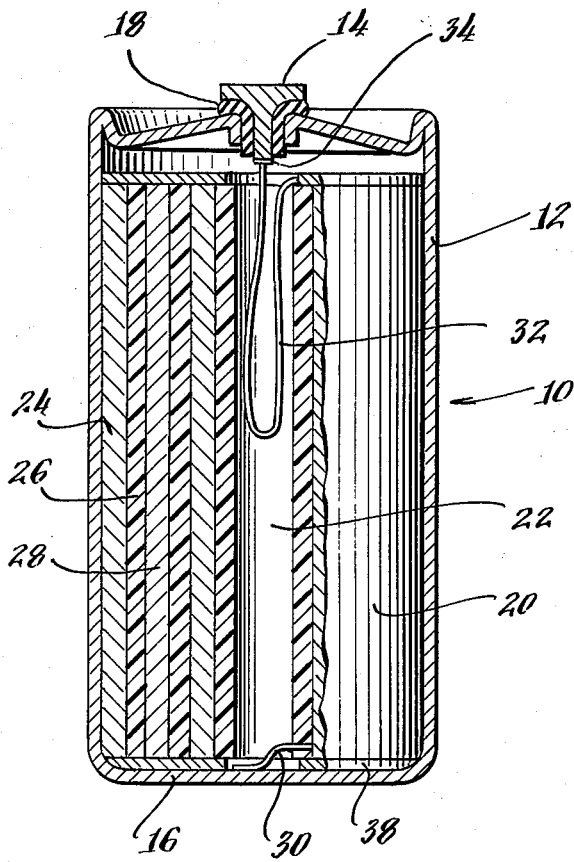
Fig. 1.
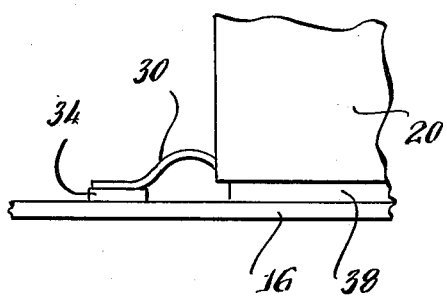
Fig. 2.
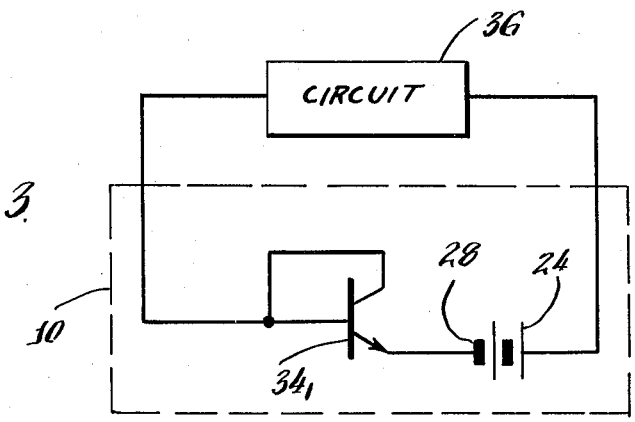
Fig. 3.
Fig. 4.

PRIMARY ELECTROCHEMICAL CELL

BACKGROUND OF THE INVENTION

This invention relates generally to electrochemical power cells, and is more particularly concerned with those cells termed primary electrochemical cells.

In copending application Ser. No. 305,813, now abandoned, filed Nov. 13, 1972, and assigned to the assignee of the instant application, there are described primary electrochemical cells having an oxidizable active anode material, such as lithium, a carbon cathode, and an electrolytic solution between and in contact with the anode and cathode, the electrolytic solution comprising a covalent inorganic oxyhalide solvent, such as phosphorus oxyhalide, monofluorophosphoryl dichloride, thionyl chloride, or sulfuryl chloride, and a solute dissolved therein. It has been found that the carbon cathode material catalyzes the electrochemical decomposition of the solvent during discharge of the cell, thereby enabling the otherwise "dead" weight of the solvent to be utilized as a source of energy.

In copending application Ser. No. 305,796, filed Nov. 13, 1972, and assigned to the assignee of the instant application, there are described primary electrochemical cells having an oxidizable active anode material, such as lithium, a cathode including, as the active cathode material, an intercalation compound of carbon and fluorine of the general formula $(C_4F)_n$, and an electrolytic solution between and in contact with the anode and cathode, the electrolytic solution comprising a covalent inorganic oxyhalide solvent selected from those set forth above, and a solute dissolved therein. It has been found that the above-identified intercalation compound will catalyze the electrochemical decomposition of the solvent resulting, unexpectedly, in a cell having a coulombic cathode utilization efficiency greater than 100 percent of that theoretically attainable according to reduction of the active cathode material. Once again, the otherwise "dead" weight of the electrolytic solvent can be utilized as a source of energy.

During operation of such lithium anode primary cells, it has been found that over-pressurization and, in some cases, failure of the cell occurs through rupture of the outer case after constant current over-discharge; i.e., the cells had been drained below zero volts, and a subsequent attempt was made to recharge the "dead" cells. The recharging current on such accasions was in the opposite direction to the normal discharge current flow in the cell. Such current flow in a recharging attempt causes dendritic lithium to form on the lithium anode. When the electrodes are of a similar dimension, as they are in spiral electrode configuration cells, this anode growth has been found to be concentrated around the edges of the electrodes, where it can easily grow across the space between the electrodes and short circuit the cell. The passage of a recharging current through such a short circuit can heat the lithium to the melting point at which time it is believed to react exothermically with a sulfur-containing product generated by the cell reactions during the discharge process. This reaction is believed to be a cause of the over-pressurization and outer case ruptures which have occurred. Obviously, this form of failure is wholly unacceptable in a commercial product.

Furthermore, in general usage of such primary cells, many forms of equipment require the incorporation of a plurality of such cells. In many of such devices, such as portable television sets, intermediate voltages are frequently tapped off at points within the power cell chain for specific circuit voltage requirements. If one or more of the primary cells are inadvertently inserted into the equipment in a reversed polarity configuration, two problems occur. Firstly, the flow of current through the misplaced cell is in the recharging direction, which again can cause the aforementioned type of failure of the cell and endanger the equipment in which it is used. Secondly, due to the fact that the potential across the misplaced cell must be subtracted from that of the correctly aligned cell within the equipment, voltages are necessarily impressed across circuit elements within the equipment which are significantly lower than those for which the equipment is designed. Such lower voltage operation can be extremely deleterious to the equipment and must be avoided.

SUMMARY OF THE INVENTION

Accordingly, it is an object of the present invention to provide a novel apparatus for preventing current flow in a recharging direction within a primary cell.

It is a second object of the invention to incorporate means for preventing such current flow directly into the primary cell in a manner which will prevent tampering.

It is a further object of the invention to provide such apparatus which may be easily and economically incorporated directly into present primary cell manufacturing methods.

Briefly, the invention in its broadest aspect is included in a primary cell having an outer case, an anode, a cathode, and an electrolyte between and in contact with the anode and the cathode. The anode, cathode, and electrolyte are all disposed within the outer case. A device having essentially unidirectional current flow and low voltage drop in the current flow direction characteristics is electrically connected to one of the anode and cathode in such a manner that current flow in a recharging direction in the primary cell is prevented so that recharging and reverse polarity operation of the primary cell is precluded. The device is also disposed within the outer case of the primary cell. Furthermore, means are provided for conducting heat away from the device so that it is protected against heat degradation when high current is passed therethrough.

These and other objects, advantages and features of the instant invention will be apparent upon consideration of the following detailed description thereof, taken together with the accompanying drawing.

BRIEF DESCRIPTION OF THE DRAWING

In the drawing:

FIG. 1 is a sectional view of a primary electrochemical cell according to the present invention, FIG. 2 is an enlarged, fragmentary sectional view of a portion of the primary electrochemical cell shown in FIG. 1, showing an alternative location for the protective device, FIG. 3 is a schematic diagram of a simple circuit showing the use of a transistor as the protective device, and FIG. 4 is a schematic diagram of an alternative circuit to that of FIG. 3 wherein a diode is utilized as the protective device.

DETAILED DESCRIPTION OF THE PREFERRED EMBODIMENTS

In referring to the various figures of the drawing herein below, like reference numerals will be utilized to refer to identical parts of the apparatus.

Referring initially to FIG. 1, there is shown a cross-sectional view of a primary electrochemical cell 10 according to the present invention. The cell 10 is formed within an outer case 12, commonly referred to as a "can." The operative terminals of the cell are a button-type cathode 14 located centrally in the top of the can 12 and the anode is the bottom surface 16 of the can 12. The cathode 14 is separated from the outer case 12 by an insulating separator 18. The electrodes of the primary cell 10 are located in the interior of the outer case 12. The electrodes in a lithium primary cell are generally spiral wound electrodes and are disposed in the space identified by reference numeral 20. The structure of this portion of the primary cell includes an anode material 24, an insulating separator 26, and a cathode material 28. These materials are fully described in the aforementioned copending applications, the subject matter thereof being incorporated herein by reference. The anode material 24 is connected to the bottom 16 through a spot-welded connecting strip 30. Similarly, the cathode material 28 is connected to the external cathode contact 14 through a wire 32. A more complete teaching of the internal structure of such a cell is found in U.S. Pat. No. 3,510,353 to McHenry, the teachings of which are also incorporated herein by reference.

In the embodiment shown in FIG. 1, a device 34 having essentially unidirectional current flow and low voltage drop in the current direction characteristics is disposed between the lead wire 32 and the external cathode contact 14. The device is electrically oriented such that current is allowed to flow in the cell from the cathode 28 to the anode 24. In this manner current flow in the opposite or recharging direction within the primary cell 10 is prevented such that recharging and reversed polarity operation of the primary cell are effectively precluded.

Since commercially available battery recharging circuitry often imposes relatively high voltages across the "dead" cell, the unidirectional device chosen should be able to withstand a peak inverse voltage of at least 50 volts so that the device cannot be damaged by application of a high reverse potential across it which, of course, would subsequently also damage the primary cell in which it was contained. Ideally, the peak inverse voltage for the device chosen should be greater than approximately 150 volts.

In order to function properly the unidirectional device chosen should have a forward current carrying capacity of at least about 7 amperes for short periods of time, on the order of three minutes or less. This requirement is based on the fact that such primary cells find greatest application in those configurations in which such current levels are required.

Lithium primary cells generally have open circuit potentials on the order of 3 to 4 volts; therefore, the voltage drop in the forward direction across the chosen unidirectional device must be kept to a minimum. Otherwise, the benefits to having such cells are severely reduced. The voltage drop in the forward direction, $V_f$, should be less than about 0.5 volts and ideally is less than 0.2 volts.

Limiting $V_f$ to the aforenoted low voltages secondarily insures that the heat buildup in the device during operation will be minimal. However, if the unidirectional device 34 is mounted in a manner such as shown in FIG. 1, against a heat conductive member such as the cathode button 14 which can conduct the heat generated within the device 34 away and keep the temperature thereof low, greater insurance of the device's effective operation is obtained. It is within the purview of the invention that the device 34 be physically mounted at any location within the outer case 12 wherein means may be supplied to conduct the heat generated therein during operation away from the device.

By mounting the protective device 34 internally to the primary cell 10, an additional advantage is gained. That is, the user is unable to disable the function of the protective device without totally destroying the primary cell per se. Were such a device to be mounted externally to the case 12, such tampering would be greatly facilitated.

As noted above, the protective device 34 may be located at any location within the primary cell 10 which is convenient, mechanically and electrically, such as, for example, the alternative mounting shown in FIG. 2. Therein the device 34 is implaced against the bottom 16 of the can 12 between that bottom 16 and the anode lead 30. Once again, the proper electrical orientation of the device is required. Here again, the bottom 16 acts as a heat sink to maintain the unidirectional device 34 at a convenient operating temperature.

So far, the device 34 has merely been described by its functional characteristics. It has been found that suitable components for incorporation as the protective device 34 include power diodes, power transistors, and hot carrier diodes. Other comparable unidirectional devices may also be used provided only that they are compatible with the desired results and are of a size permitting incorporation directly within the primary cell container. It has been found preferable that the unidirectional device 34 be incorporated into the primary cell 10 as an unencapsulated semiconductor chip. Such a device configuration results in compactness and in ease of heat removal from the device to the heat sink member attached thereto.

It is presently preferred that the semiconductive device be a germanium device rather than a silicon based component since $V_f$ is much lower, approximately 0.2 to 0.4 volts, for germanium than for silicon devices, wherein $V_f$ equals approximately 0.75 to 1.0 volts. The following exemplary germanium power transistors have been found to be useful in the present application: 2N3611–2N3618, 2N1549–2N1560, and 2N627–2N629. When such a power transistor is utilized the base and the collector are tied together externally to the semiconductor chip.

Two simplified exemplary circuits showing the orientation and interconnection of various devices for use in the present context are shown in FIGS. 3 and 4. In FIG. 3, a transistor $34_1$ having its base and collector joined together is placed in a circuit with an external load circuit 36. Here, the joint base/collector terminal is connected to the external circuit and the emitter is connected to the cathode material 28. Were the transistor $34_1$ an NPN transistor, the base/collector and emitter connections would be reversed. Similarly, the device could be inserted in the circuit between the load 36 and the anode material 24. FIG. 4 is completely similar to FIG. 3 except that a diode $34_2$ is substituted for the transistor $34_1$ in FIG. 3.

While the foregoing description of the preferred embodiments of the invention have been described with particular emphasis on the incorporation of protective devices into electrochemical primary cells utilizing lithium as an anode material and carbon as a cathode material, it is considered within the purview of the invention that the invention is applicable to use and incorporation in all electrochemical cells where recharging and/or reversed polarity operation thereof is desired to be prevented.

It will be understood by those of ordinary skill in the art to which the invention pertains that various changes and modifications may be made therein without departing from the scope of the invention as defined in the appended claims.

I claim:

1. A primary cell comprising
   an outer case,
   an anode,
   a cathode,
   an electrolyte between and in contact with the anode and the cathode,
   the anode, cathode and electrolyte being disposed in the outer case,
   a device having essentially unidirectional current flow and low voltage drop in the current flow direction characteristics, being electrically connected to one of the anode and cathode in such a manner that current flow in a recharging direction in the primary cell is prevented so that recharging and reversed polarity operation of the primary cell are precluded, and being disposed within the outer case, and
   means for conducting heat away from the device so that the device is protected against heat degradation when high current is passed therethrough.

2. A primary cell according to claim 1, wherein the device is semiconductive.

3. A primary cell according to claim 2, wherein the semiconductive device is a germanium semiconductive device.

4. A primary cell according to claim 2, wherein the semiconductive device is a diode.

5. A primary cell according to claim 4, wherein the semiconductive device is a hot carrier diode.

6. A primary cell according to claim 2, wherein the semiconductive device is a transistor with the base and collector connected together.

7. A primary cell according to claim 2, wherein the semiconductive device has a voltage drop in the current flow direction of less than about 0.5 volts and a peak inverse voltage greater than about 50 volts.

8. A primary cell according to claim 7, wherein the voltage drop is less than about 0.2 volts and the peak inverse voltage is greater than about 150 volts.

9. A primary cell according to claim 2, wherein a positive contact and a negative contact which are mutually electrically isolated are disposed on the exterior of the outer case and the semiconductive device is connected to an appropriate one of the contacts.

10. A primary cell according to claim 9, wherein a portion of the outer case is formed of a material having a high coefficient of thermal conductivity and the semiconductive device is thermally connected to the portion.

11. A primary cell according to claim 10, wherein the semiconductive device is attached directly against the portion.

12. A primary cell according to claim 1, wherein the primary cell is a lithium primary cell wherein the anode material includes lithium and the cathode material includes carbon.

* * * * *